E. A. PACK & R. A. MOON.
LOCK BOLT AND NUT.
APPLICATION FILED NOV. 23, 1910.

1,017,583.

Patented Feb. 13, 1912.

Inventors
Earle A. Pack.
Rupert A. Moon.

Witnesses

By

Attorneys

UNITED STATES PATENT OFFICE.

EARLE A. PACK AND RUPERT A. MOON, OF WEISER, IDAHO.

LOCK BOLT AND NUT.

1,017,583.  Specification of Letters Patent.  Patented Feb. 13, 1912.

Application filed November 23, 1910. Serial No. 593,932.

*To all whom it may concern:*

Be it known that we, EARLE A. PACK and RUPERT A. MOON, citizens of the United States, residing at Weiser, in the county of Washington, State of Idaho, have invented certain new and useful Improvements in Lock Bolts and Nuts; and we do hereby declare the following to be a full, clear, and exact description of the invention, such as will enable others skilled in the art to which it appertains to make and use the same.

This invention relates to improvements in nut locks and the leading object in view is the construction of a nut lock having engaging nuts one of which is provided with spaced openings and the other of which is provided with a spring locking pin adapted to fit into either one of the openings and which pin is so constructed that it can be locked in an inoperative position by a slight turning movement thereof.

With the above and other objects in view the invention consists in certain constructions, combinations and arrangements of parts, clearly described in the following specification and clearly illustrated in the accompanying drawings in which:—

Figure 1:
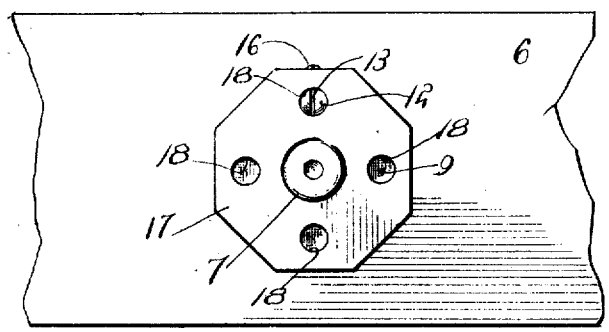
Figure 2:
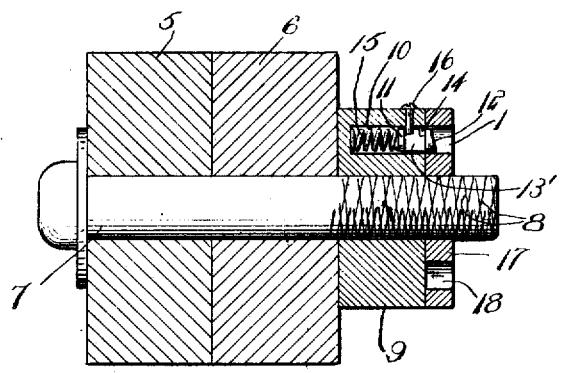
Figure 3:
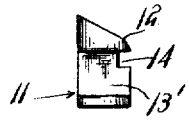
Figure 4:
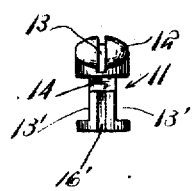

Figure 1 is an end view showing the perforated nut. Fig. 2 is a longitudinal sectional view showing the arrangement of the locking pin. Fig. 3 is a detail side elevation of the locking pin removed from the socket of the inner nut. Fig. 4 is another side elevation of the locking pin.

Referring to the accompanying drawings illustrating the preferred embodiment of the invention, 5 and 6 denote the plates or material to be bolted together which plates or material are provided with registering bolt openings through which the bolt 7 is passed. The bolt 7 is provided with right and left screw threads 8. A large nut 9 is threaded on the threads 8 against the plate or material 6. The nut 9 is provided with right screw threads and is formed with a socket or opening 10 in which the spring locking pin 11 is disposed. The locking pin 11 is provided with an inclined outer head 12 which is formed with a slot 13 to receive the point of a screw driver and like tool, and said pin is formed with longitudinally disposed side grooves 13' which communicate with a transverse groove 14 located near the inclined slotted head 12. A spring 15 bears against the inner end of the pin 11 so as to hold the inclined head 12 outwardly of the outer face of the nut 9. The pin 11 is held in the socket or opening 10 for limited movement by a screw 16 which extends transversely of said socket and the inner end of said screw 16 projects into the path of the movement of the pin 11 so as to engage with the inner end of said pin and the head 12 thereof.

When it is desired to hold the inclined head 12 of the pin 11 in the opening or socket 10 the pin is rotated in said opening or socket so that the screw 16 will project into the slot of the groove 14, but when it is desired to hold the pin in the opening for limiting movement, said pin is arranged so that the inner end of the screw projects into one of the slots 13'.

A second or outer nut 17 is threaded on the bolt 7 against the nut 9. The nut 17 is provided with radially spaced openings 18 adapted to receive the inclined head 12 of the pin 11. When the pin 11 is arranged in the opening 10 for slight movement and with its inclined head 12 projecting outwardly of the opening and the outer nut 17 is threaded against the inner nut 9 the pin will engage with the openings 18 of said outer nut 17 until finally the outer nut 17 contacts with the inner nut 9 and can no longer be tightened on the bolt 7. When the outer nut reaches its innermost position on the bolt 7 one of the openings 18 will be in registering position with the pin 11 and the inclined head of said pin will spring into said opening so as to hold the nut against further rotation. The inclined head 12 of the pin 11 permits the inward movement of the outer nut 17 and prevents the outward movement of said nut 17 and thereby locks the two nuts and consequently the bolt, by reason of the right and left screw threads of the bolts and the two nuts against movement.

The pin 16 is preferably forced into the nut 9 when the same is very hot so it will be fixed to said nut 9. The locking pin 11 is formed with a longitudinally disposed slot 16' which is adapted to engage the inner end or terminal of the pin 16 and permit of the removal of said pin 11 when the spring 15 is broken and consequently permit the replacement of a broken spring.

The improved nut lock can be manufactured very cheaply and is capable of wide application in the mechanical arts, and does not require any radical change in the construction of the bolt and nut fastening devices.

What is claimed is:—

1. In a nut lock, a bolt having right and left hand screw threads, a nut having right screw threads fitted on said bolt, said nut being provided with a socket, a spring pressed pawl arranged within said socket, said pawl being provided with a beveled face, a pin carried by said nut, said pin extending within said socket, the end portion of said pin being arranged to enter a longitudinal slot formed in said pawl, said pawl being formed with a transverse slot to receive the end portion of said pin when the pawl is forced against the tension of said spring, and a nut provided with left hand threads, said nut being formed with a plurality of apertures to receive the beveled end portion of said pawl.

2. In a nut lock, a bolt having right and left hand screw threads, a nut provided with right threads fitted on said bolt, a socket formed in said nut, a pawl mounted for movement within said socket, a spring bearing against the end portion of said pawl, a pin carried by said nut, said pin extending within said socket, and entering a transverse groove formed in the pawl to hold the same against the tension of said spring, said pawl being provided with a longitudinally arranged groove adapted to normally accommodate the end portion of said pin, and a second nut provided with left threads, said nut being formed with apertures to receive the end portion of said pawl.

3. In a nut lock, a bolt having right and left screw threads, a nut having right threads fitted on the bolt, said nut having a socket, a pawl disposed in the socket bearing against a spring, said pawl being provided with an inclined slotted outer end and with body slots, two of said slots being formed in the sides of the pawl and extending longitudinally of said pawl and one of said slots being formed transversely in said pawl and communicating with the longitudinal slots, a pin threaded in the nut adapted to engage either of the slots of the pawl to hold said pawl in the nut socket for limited movement or against movement with the inclined head thereof secured inwardly of the outer face of the nut, and a nut threaded on the bolt and formed with left screw threads to engage the screw threads of the bolt and with openings adapted to receive the inclined end of the locking pawl.

In testimony whereof, we affix our signatures in presence of two witnesses.

EARLE A. PACK.
RUPERT A. MOON.

Witnesses:
A. L. TRENAM,
MILES CANNON.